United States Patent [19]

Bonsack

[11] 4,343,775

[45] Aug. 10, 1982

[54] ENTRAINED-FLOW CHLORINATION OF FINE TITANIFEROUS MATERIALS

[75] Inventor: James P. Bonsack, Aberdeen, Md.

[73] Assignee: SCM Corporation, New York, N.Y.

[21] Appl. No.: 251,183

[22] Filed: Apr. 6, 1981

[51] Int. Cl.³ .............................................. C01G 23/02
[52] U.S. Cl. ....................................... 423/78; 423/79; 75/1 T
[58] Field of Search ...................... 423/76, 78, 79, 492; 75/1 T

[56] References Cited

U.S. PATENT DOCUMENTS

| | | | |
|---|---|---|---|
| 3,495,936 | 2/1970 | Jones, Jr. ................................. | 23/87 |
| 3,787,556 | 1/1974 | Piccolo et al. .......................... | 423/77 |
| 3,977,862 | 8/1976 | Glaeser ................................... | 75/1 T |
| 3,977,863 | 8/1976 | Glaeser ................................... | 75/1 T |
| 3,977,864 | 8/1976 | Glaeser ................................... | 75/1 T |
| 4,183,899 | 1/1980 | Bonsack ................................. | 423/79 |

Primary Examiner—Herbert T. Carter
Attorney, Agent, or Firm—Robert A. Sturges; Merton H. Douthitt

[57] ABSTRACT

A flow process is described for the chlorination of titaniferous materials. The process utilizes a special microporous carbon characterized by having pores with a pore diameter of less than 20 Å. Improved reaction rates and completeness of reaction are achieved.

5 Claims, 2 Drawing Figures

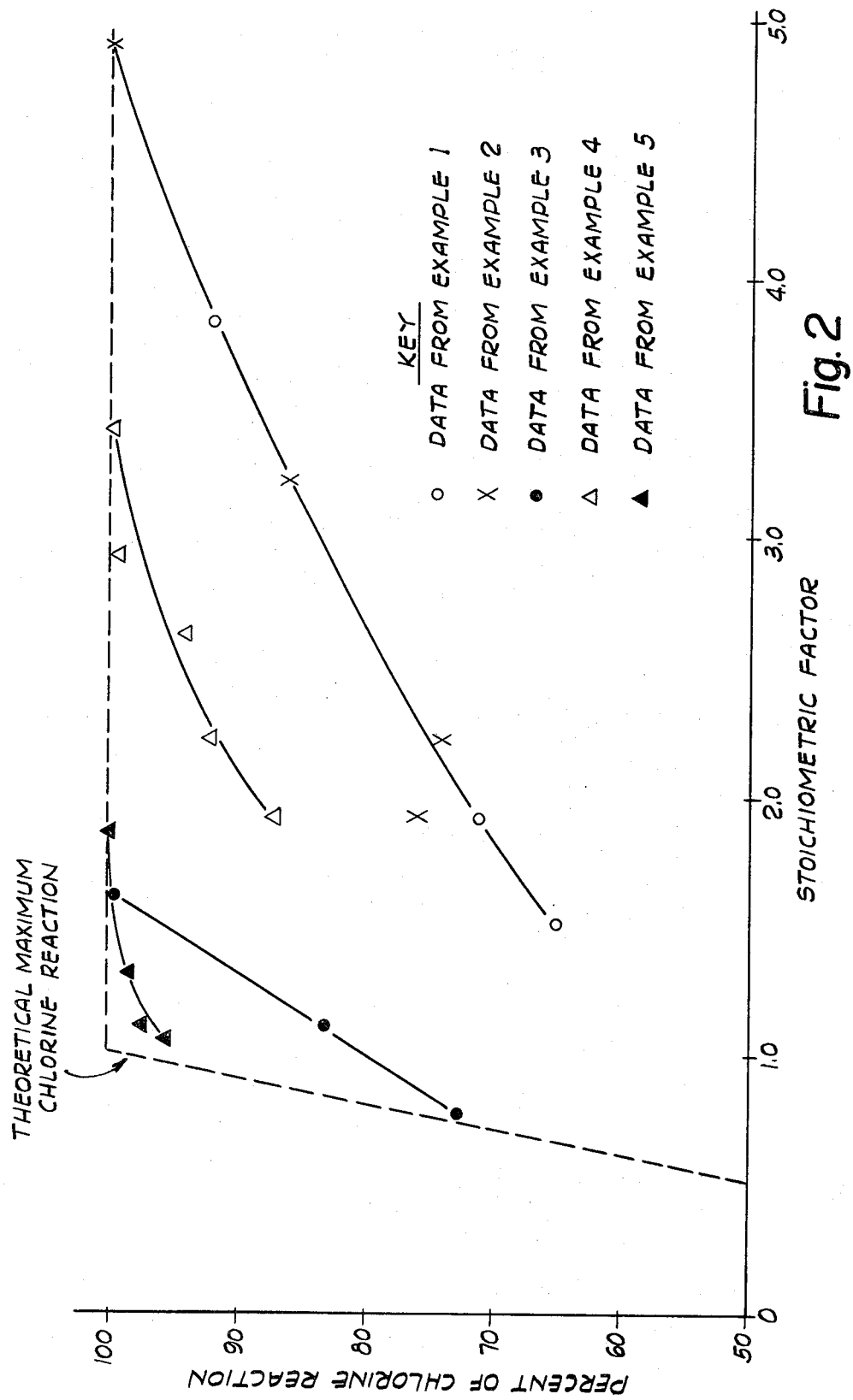

ENTRAINED-FLOW CHLORINATION OF FINE TITANIFEROUS MATERIALS

BACKGROUND OF THE INVENTION

This invention relates to the chlorination of titaniferous materials using a special porous carbon reductant.

Titaniferous materials are often subjected to chlorination as chlorination is an efficient and economical way to obtain a high purity source of titanium for making titanium alloys, titanium compounds, and especially pigmentary titanium dioxide. Several processes have been described in the art for the chlorination of titaniferous materials. Such processes generally react a titanium-containing raw material such as rutile ore or ilmenite ore, with a chlorine-providing material and a carbon reductant at an elevated temperature according to one or both of the following equations:

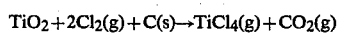

$$TiO_2 + 2Cl_2(g) + C(s) \rightarrow TiCl_4(g) + CO_2(g)$$

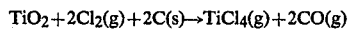

$$TiO_2 + 2Cl_2(g) + 2C(s) \rightarrow TiCl_4(g) + 2CO(g)$$

Conventional chlorination reactions are generally carried out at about 1000° C., but can be carried out at any temperature in the range from about 800° C. to about 2000° C., using various conventional carbon reductants and chlorine sources.

The chlorination reactions can be carried out in a variety of reaction zone configurations. Fixed-bed, fluidized-bed, and flow reaction zones have been utilized. Each type of reaction zone has known advantages and disadvantages; however, the fluid-bed reaction zone is by far the preferred type for commercial processes. A key disadvantage of the flow processes has been that the chlorination reactions proceed at a relatively slow rate under most conveniently achieved reaction conditions and therefore an extremely long reaction chamber is required to provide the necessary residence time for the reactants within the chamber and a large excess of ore is required to cause the chlorine to react substantially completely.

It has now been found that a flow process for the chlorination of titaniferous materials can be accomplished within a reaction zone of reasonable size in an efficient fashion if the carbonaceous reductant utilized is a porous carbon having micropores with a pore diameter of less than about 20 Å.

One embodiment of the present invention is to chlorinate powdered titanium-containing materials and ores in a down-flow chlorination reaction zone wherein powdered porous carbon reductant and the titanium-containing material are entrained in a stream of down-flowing chlorine-providing gas. The chlorination reactions proceed substantially to completion as the material falls through the reaction chamber.

Another process is to chlorinate titanium- and iron-containing materials and ores to produce titanium chlorides and by-product metallic iron in a laminar-flow process. According to this process, the stoichiometry of the reactants is controlled along with the reaction temperature and the flows of the process are designed to prevent any back mixing within the reaction chamber, thus a metallic iron by-product is produced instead of the conventionally produced iron chloride by-product.

It is an object and advantage of the present process that it utilizes a flow of reactants rather than a fixed or a fluidized bed.

It is a further object of the present invention that powdered raw materials instead of granular raw materials can be utilized in the present process, such powdered materials being readily available and largely commercially overlooked because of the expense of processing. A further object and advantage of the present invention is that reaction times and reaction rates are greatly enhanced, thus allowing for the use of smaller reaction zones for the above-described flow processes.

These and other objects and advantages of the present invention will become more apparent from the detailed description of the invention.

SUMMARY OF THE INVENTION

The present invention is a flow process for chlorinating a titaniferous material. The process comprises reacting discrete particles of titaniferous material and a chlorine-providing material selected from the group consisting of chlorine gas, an organochloride, and mixtures thereof in the presence of a porous carbon reductant while said particles of titaniferous material flow through a chlorination reaction zone at a temperature of at least about 800° C. The porous carbon reductant is characterized by having a pore diameter of less than about 20 Å and preferably having a surface area within said micropores of at least about 10 m²/g. The present process has been found effective and efficient for substantially chlorinating the titanium values of most titanium-bearing ores, and particularly of powdered ores having a particle size of less than about 0.1 mm.

BRIEF DESCRIPTION OF THE DRAWINGS

FIG. 2 is a graph showing the results of experimental chlorination of Brazilian Anatase using conventional carbon and using the present special microporous carbon.

DETAILED DESCRIPTION OF THE INVENTION

Figure 1:
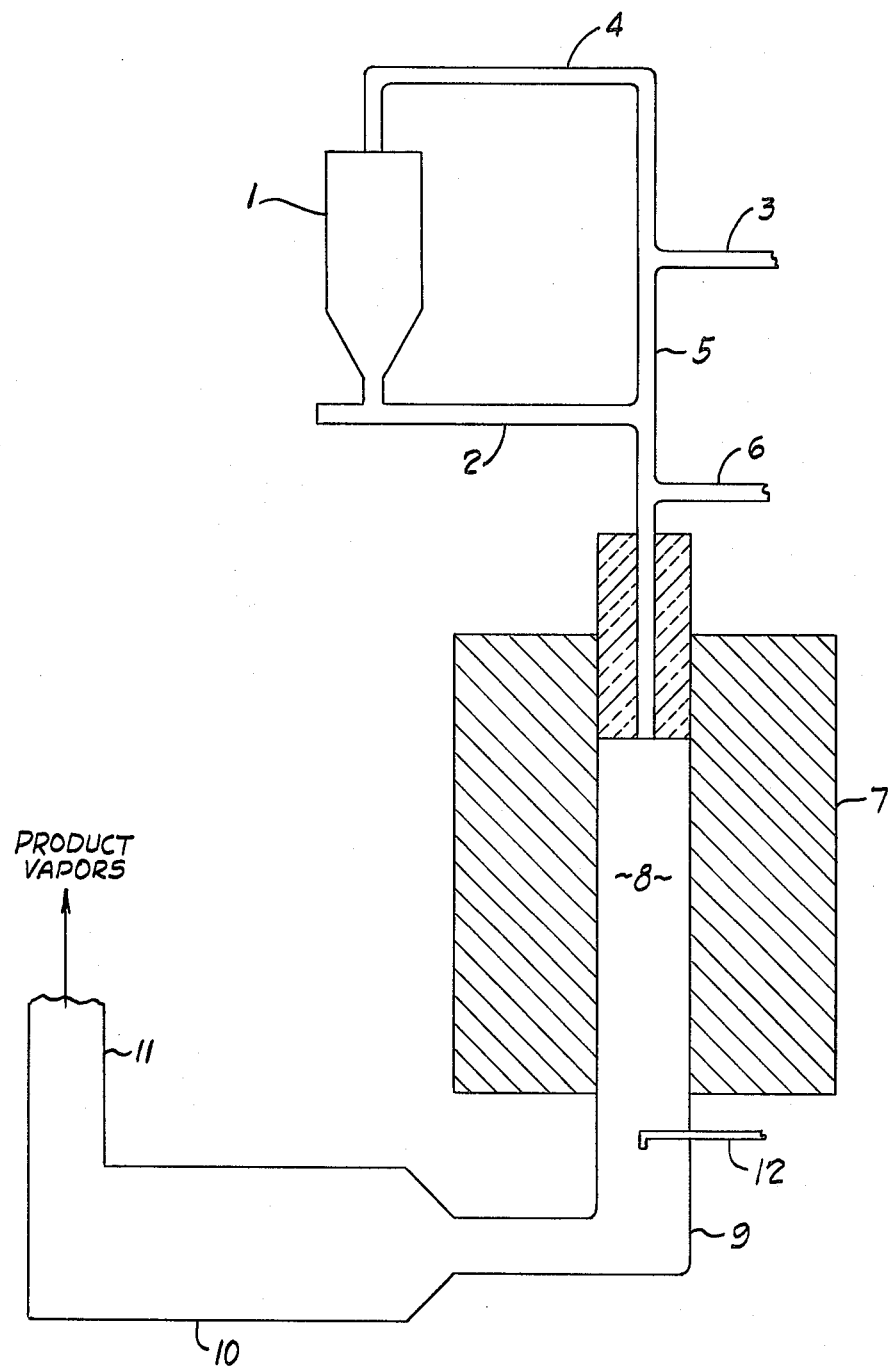
FIG. 1 is a schematic of the experimental apparatus used in Example 1 to demonstrate a down-flow embodiment of the present invention.

The present invention is a flow process for chlorinating a titaniferous material. The titaniferous material is reacted with a chlorine-providing material in the presence of a porous carbon reductant while the particles of titaniferous material flow through a chlorination reaction zone.

Porous carbon reductants useful in the present invention contain micropores having a pore diameter of less than about 20 Å. Typically, such porous carbon reductants will have at least about 10 m²/g. of surface area in such micropores, advantageously about 100 m²/g. of surface area in such micropores and preferably about 500 m²/g. of such internal surface. Non-porous carbons and carbons having exclusively large pores, e.g. charcoal, are not within the scope of the present process. In addition, the preferred carbons used in the present invention should have less than about 1500 m²/g. of internal surface area and preferably less than about 1000 m²/g. of internal surface area in said micropores. Surface area as expressed here and throughout this specification is "effective surface area" as determined from the $N_2$ absorption isotherm at $-195°$ C. and application of the standard Brunauer, Emmett, and Teller (BET) Procedure. A Digisorb 2500-Automatic Multi-Gas Surface Area and Pore Volume Analyzer manufactured by Micromeritics Instrument Corporation, Norcross, Ga., was used to make these measurements.

The carbon particles can have any size useful in the present chlorination process. In a down-flow chlorination reaction zone the carbon particles must be small enough to fall at a rate similar to the titaniferous material particles, such rate of fall being sufficiently slow to allow an adequate time within a reactor for chlorination to take place. Powdered materials of about −200 mesh are generally adequate; however, various sizes, generally −140 mesh and finer, may be useful. In a laminar-flow process the carbon particles must also be appropriately sized; however, in this case they must also be sized so as to pass through the reaction zone without back mixing in a substantially plug flow with the titaniferous material. Suitable materials can be predominantly less than about 40 microns and preferably substantially all will pass through a 325-mesh sieve.

A preferred porous carbon is appropriately sized coal treated to increase its internal surface area by making it porous. Coal is an inexpensive source of carbon and it can be obtained relatively free of undesirable impurities. It is readily available in various sizes and size distributions useful in the present invention. Coal is also an amorphous form of carbon and this attribute has been found to be advantageous in the present invention.

The titaniferous material useful in the present invention can be any titanium-containing compound or raw material such as rutile ore, ilmenite ore, or other. A particularly advantageous raw material is a powdered titaniferous material which in its raw state has too small a particle size for a fluid-bed chlorination process. Such materials occur in the tailings of certain copper mining operations and in some naturally occurring anatase ore deposits. Typically, the titaniferous material will be similarly sized to the carbon reductant with which it reacts. Various sizes from about −100 mesh to about −325 mesh can be useful. In addition, a titaniferous material can be substantially pure or contain a wide variety of impurities. In this respect, a greater variety of impurity compounds are permissive in flow chlorination processes than in fluid-bed or fixed-bed processes. In the flow process, the impurities do not build up in the beds causing sticky deposits to accumulate. Therefore, larger amounts of impurities can be tolerated without repetitive frequent shutdowns to clean the chlorination reactors. For example, in the laminar-flow process, the titaniferous material preferably contains a substantial proportion of iron for practical commercial scale operations. Most often, an Fe/Ti ratio of about 0.5 to about 1.5 is utilized.

The feed solids (titaniferous material plus carbon) concentration within the reaction zone is typically maintained at about 0.01 lb/ft$^3$ to about 0.20 lb/ft$^3$ and preferably less than about 0.06 lb/ft$^3$ when measured at reaction temperatures.

The chlorine-providing material can be chlorine gas, an organochloride, or a mixture thereof. Chlorine gas (Cl$_2$) is preferred because it contains a high percentage of chlorine per volume of gas.

The chlorination reaction zone useful in the present flow process is preferably an elongated chamber having an inlet for the particulate reactants and the chlorine-providing gas near one end of the chamber and an outlet for titanium chlorides and by-product materials near the other end of the chamber. The particulate materials flow through the chamber either by gravity, as in a down-flow chamber, or carried on the chlorine-providing gas stream or on a secondary carrying gas stream flowing through the chamber. The down-flow design is preferred for convenience and economy. When the down-flow design is utilized and gravity provides the carrying force for the reactants to flow through the reaction zone, the walls of the chamber should be inclined within 15 degrees of vertical to prevent buildup and allow for continuous operation.

During the reaction process, the temperature within the chlorination reaction zone is maintained at greater than about 800° C. and advantageously greater than about 1000° C. The off-gas stream is collected at the outlet end of the chlorination reaction zone and cooled to condense the products and facilitate their collection.

According to the down-flow embodiment of the present invention, powdered porous carbon and powdered titaniferous material are entrained in a stream of chlorine-providing gas and introduced into the chlorination reaction zone wherein they proceed in a substantially downward path. The chlorination reaction temperature is maintained at a temperature from about 800° C. to about 1200° C. and the reaction zone is sufficiently long so that the falling carbon and titaniferous material experience a retention of between about 1 and 20 seconds within the chlorination reaction zone.

According to the laminar-flow process, the titaniferous material is reacted substantially as described in U.S. Pat. No. 4,183,899, except that the porous carbon reductant of the present invention is substituted for the carbons described in that patent. Accordingly, a mixture of powdered porous carbon reductant and titaniferous material is passed in substantially laminar or plug flow (i.e. without back mixing) through a chlorination reaction zone maintained at about 1050° C. to about 1950° C., preferably 1350° C. to 1950° C., the atomic ratio of carbon in said mixture to the oxygen content in said mixture being greater than 1:1 for formation of CO, the ratio of the moles of chlorine in said chlorinating agent to said titanium in said titaniferous materials being not substantially above about 2 and the ratio of iron to titanium (Fe/Ti) and the titaniferous material passed into said zone being not substantially above 2.

The off-gas stream from the chlorination reaction zone contains product titanium chlorides, by-product gases, and particulates. The off-gas stream is cooled to condense the product titanium chlorides and to facilitate their separation from the impurities in the off-gas stream. A convenient way to separate the product chlorides from the by-products is by a solid-gas separation at a temperature above the temperature at which the titanium chlorides condense. A preferred solid-gas separation is the use of a cyclone separator at a temperature of about 140° C. to about 300° C. and preferably about 175° to 200° C.; such separation being similar to that used in a conventional chlorination process to collect particulates in the TiCl$_4$ off-gas stream. Separation can be practiced after the titanium chloride products have been condensed, in which case a solid-liquid separation such as decanting or filtration would be used.

The porous carbon reductant useful in the present invention can be produced from non-porous carbons by reacting in a fluidized bed at an elevated temperature with air, CO$_2$, and/or steam until micropores are produced. Typically, about 5% or more of the carbon will be burned off during such treatment. Generally, the more micropores produced and the higher internal surface area created, the higher the carbon burn-off will be. Therefore, it is preferred to treat to a minimum effective internal surface area in order to obtain the maximum yield from the carbon raw materials. This treatment should be carried out above about 400° C. When steam or $CO_2$ is used, the reaction is endothermic. When air is used, the reaction is exothermic and will maintain itself without the introduction of any outside heat source. Preferably, such processes can be carried out on a continuous basis with the continuous feeding of carbon and removal of treated product.

An economic and advantageous carbon source is coal. Preferably, the coal used is high rank (anthracite) rather than low rank (bituminous) because the high rank coals attain a higher internal surface area during the above treatment. The coal introduced into the treatment process can be either wet or dry. Dry coal is actually preferred; however, wet coal is a more readily available commercial product. Water is present in such wet coals to hold down dusting during transportation, as a remnant from washing, flotation, or other processing or from unprotected storage. Other processes for making porous carbons are readily available. Any available process for increasing the internal surface area of carbon can be used for making a porous carbon reductant useful in the present invention, so long as a sufficient amount of the internal micropores are produced. Such processes are typically used for producing activated carbon. Commercially available activated carbons have surface areas of up to about 3000 $m^2/g$. and are effective in the instant process. However, such materials are substantially more expensive at this time than the above-described treated coals.

The following examples will show ways in which this invention has been practiced. These examples are not intended to be limiting of the invention. In the examples, all temperatures are in degrees Centigrade and all percentages are in parts by weight, unless otherwise specified.

INTRODUCTION TO THE EXAMPLES

Referring to FIG. 1, a predetermined Ti ore/carbon charge was prepared and charged into hopper 1 for each run. Vertical quartz reactor tube 8 having an inside diameter of 7.0 cm. and a heated length of 105 cm. was heated to operating temperature of 1000° C. by electrical resistance furnace 7. During heatup the system was purged with argon introduced through line 3. When the temperature of the reactor stabilized at the desired operating temperature, the argon was turned off. Then, simultaneously the solids feeder 2 was then turned on, $Cl_2$ was introduced through line 6, and $N_2$ was introduced through line 3.

The solids feeder was calibrated for feed rate vs. motor speed setting for each new batch of Ti ore/carbon. The Ti ore/carbon ratio was about 1.56 to 1.58 in all runs.

Samples of gas leaving the bottom of the chlorination zone were taken by sampler 12 and analyzed for CO, $CO_2$, $N_2$, and $Cl_2$ by gas chromatography. The amount of unreacted $Cl_2$, if any, was calculated from the known inlet flows of $Cl_2$ and $N_2$ and the measured flows in the chlorinator off-gas.

In all of the examples, the Ti ore was Brazilian Anatase containing about 86.5% $TiO_2$, 3.3% $Fe_2O_3$, and 0.3% combined H, plus other impurities which do not participate in the present process. Three different carbons were used in the examples. The characteristics of these carbons are shown in Table I.

TABLE 1

| | Petroleum Coke | Porous Carbon A | Porous Carbon B |
|---|---|---|---|
| % C | 98 | 80 | 91 |
| % H | 0.08 | 0.82 | 0.46 |
| % Ash | 0.4 | 12 | 1.5 |
| Surface Area ($m^2/g$) | <1 | 590 | 350 |
| Surface Area in micropores of <20 A diameter ($m^2/g$) | 0 | 210 | 90 |

The Stoichiometric Factor was calculated for each run based on the amount of Ti, Fe, and combined H in the feed solids available to react with $Cl_2$ to give $TiCl_4$, $FeCl_2$, and HCl. A factor of 1.0 indicates the stoichiometric amount of Ti, Fe, and H is present to react with the $Cl_2$. A factor of 2.0 indicates a two-fold excess of Ti, Fe, and H.

The feed rates and gas flows in each experimental run were controlled to provide an approximate retention time for $Cl_2$ gas and feed solids in the reactor of 8 to 10 seconds.

EXAMPLE 1

Feed solids containing Brazilian Anatase and petroleum coke were ball milled to 75% past 325 mesh and charged into hopper 1. These feed solids were reacted with $Cl_2$ as described above. Three runs were made using this procedure. In one run, the Stoichiometric Factor was about 1.5, in the second about 1.9 and in the third about 3.8. Data are shown in FIG. 2.

EXAMPLE 2

The procedure of Example 1 was followed except that the feed solids were ball milled to 96% past 325 mesh. Four runs were made following this procedure. In these runs the Stoichiometric Factors were 1.9, 2.2, 3.2, and 4.9, respectively. Data are shown in FIG. 2.

EXAMPLE 3

In this example, feed solids containing Brazilian Anatase and Porous Carbon A ball milled to 96% past 325 mesh were charged into hopper 1 and reacted with $Cl_2$ as described. Three runs were made following this procedure. In these runs, the Stoichiometric Factors were 0.8, 1.1, and 1.6, respectively. Data are shown in FIG. 2.

EXAMPLE 4

In this example, feed solids containing Brazilian Anatase and Porous Carbon B were used. The feed solids had a fineness of about 76% past 325 mesh. Five runs were made following this procedure. In these runs, the Stoichiometric Factors were 1.9, 2.2, 2.6, 2.9, and 3.4, respectively. Data are shown in FIG. 2.

EXAMPLE 5

The procedure of Example 4 was followed except that the feed solids were ball milled to 96% past 325 mesh prior to reaction. Four runs were made following this procedure. In these runs, the Stoichiometric Factors were 1.05, 1.1, 1.3, and 1.8, respectively. Data are shown in FIG. 2.

It is readily apparent that the present carbons are surprisingly effective in the chlorination of titaniferous materials compared to a conventional carbon such as petroleum coke. The use of the present carbons allows the reactions to go substantially closer to completion at significantly lower Stoichiometric Factors. For example, when reacting with petroleum coke, a Stoichiometric Factor of about 4.9 is required for the reaction to go substantially to completion. With Porous Carbon B, a factor of no more than about 2.9 is required, and with Porous Carbon A, a factor of only about 1.6 is required. The reduction of this factor significantly improves the efficiency and economy of the present process.

What I claim is:

1. A flow process for chlorinating an iron-containing titaniferous material which comprises reacting discrete powdered particles of titaniferous material and a chlorine-providing material selected from the group consisting of chlorine gas, organochlorides, and mixtures thereof in the presence of a powdered porous anthracite coal reductant said powdered titaniferous material and said powdered anthracite coal reductant each having a particle size smaller than about-140 mesh, said particles of said titaniferous material and said powdered anthracite coal being entrained in and flowing downwardly through a chlorination reaction zone at a temperature of at least about 800° C., until both the iron and the titanium contents of said titaniferous material are substantially chlorinated, said porous anthracite coal reductant being characterized in that it has micropores having a pore diameter of less than about 20 Å and internal surface area within said micropores of at least about 10 $m^2/g$.

2. The process of claim 1 wherein said chlorination reaction zone is a substantially down-flow reaction zone and said temperature is between about 800° C. and 1200° C.

3. The process of claim 1 wherein said carbon is further characterized by having at least about 100 $m^2/g$. of surface area within said micropores.

4. The process of claim 2 wherein said carbon is further characterized by having at least about 100 $m^2/g$. of surface area within said micropores.

5. The process of claim 1 wherein said chlorine-providing material is chlorine gas.

* * * * *